J. F. HUDSON.
Corn-Planter.
No. 224,594. Patented Feb. 17, 1880.
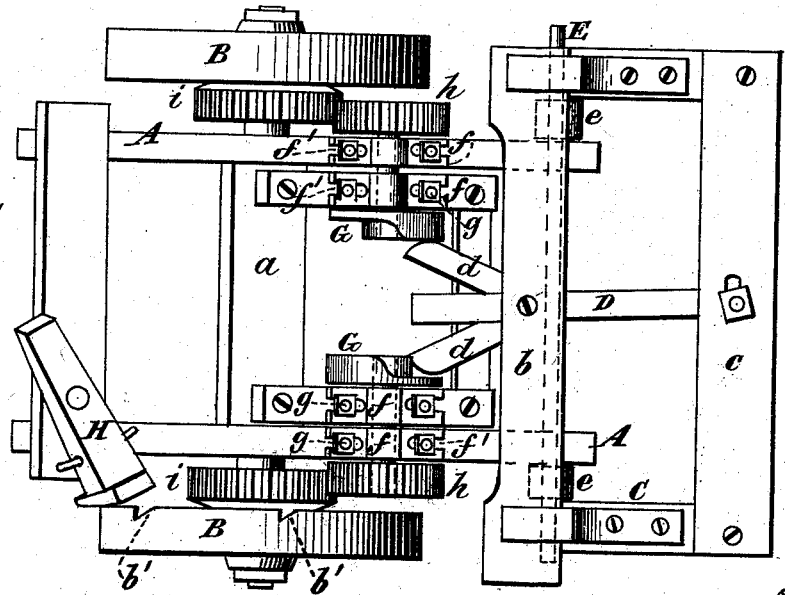
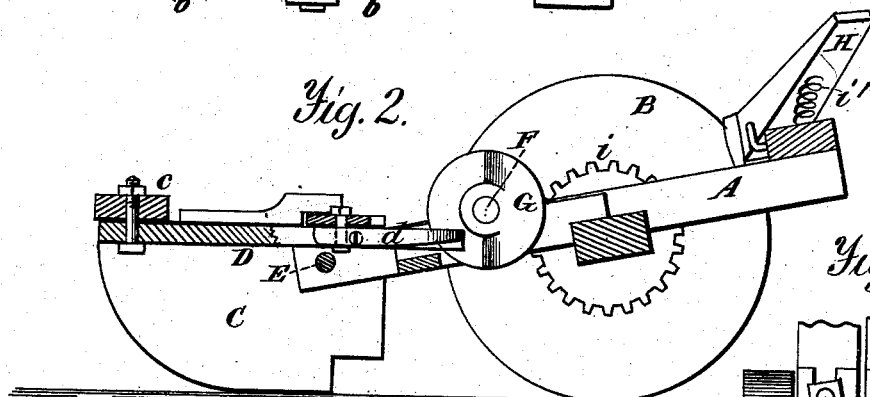
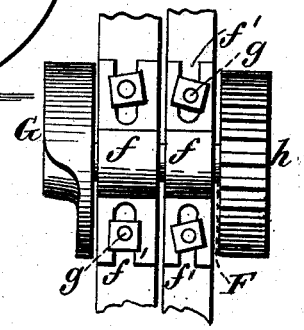
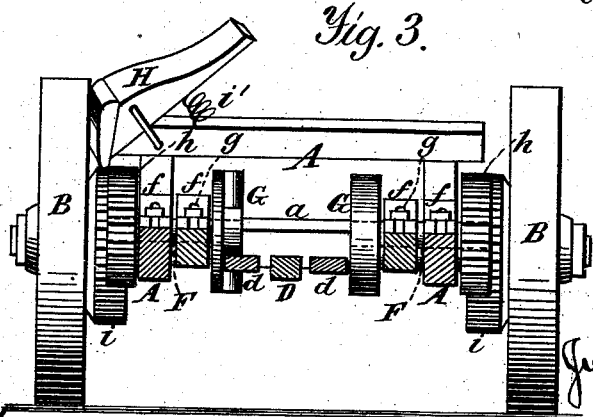
Witnesses.
A. Ruppert,
James H. Lange.
Junior F. Hudson.
Inventor.
Edson Bro's.
Attorneys.

UNITED STATES PATENT OFFICE.

JUNIOR F. HUDSON, OF WELLINGTON, ILLINOIS.

CORN-PLANTER.

SPECIFICATION forming part of Letters Patent No. 224,594, dated February 17, 1880.

Application filed August 26, 1879.

*To all whom it may concern:*

Be it known that I, JUNIOR F. HUDSON, of Wellington, in the county of Iroquois and State of Illinois, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters of reference marked thereon, which form a part of this specification, and in which—

Figure 1 is a plan view of my improved corn-planter. Fig. 2 is a longitudinal vertical section of the same. Fig. 3 is a transverse vertical section, and Fig. 4 is a detail view of one of the cams with its shaft, journal-boxes, and pinion.

This invention has relation to improvements in corn-planters; and it consists of cams on short shafts, between which is extended the seed-slide-operating bar or lever, with arms adapted to be struck by the cams; secondly, of adjustable shafts with cams, and arranged to be driven by suitable mechanism; of openers or runners connected to the planter-frame by a rod, with those portions between the side bars of said frame and the runners provided with cushions.

A in the accompanying drawings marks the planter-frame, fastened upon an axle, $a$, supplied with wheels B B, having notches $b'$ in the inner edge of the wheel, to receive a brake, as hereinafter described.

C are the openers or runners, upon which the seed or corn boxes are supported in the usual way, and having the seed or corn slide $b$. D is a lever or bar, with one end pivoted to the connecting-piece $c$ between the runners, and connected near its other end to the seed-slide $b$, while this end is provided with oblique arms $d$ $d$, with their divergent ends adapted to be struck by cams, presently described.

The openers or runners are loosely connected to the planter-frame A by a rod, E, passing through the same, and held in position by cushions $e$, supplied between the side bars of the frame and the runners. This avoids the frictional contact of the parts.

F F are short shafts or axles supported on the frame A, near its forward end, in boxes $f$ $f$, with slots $f'$, which receive adjusting-screws $g$ $g$, to permit adjusting the boxes with the shafts or axles with relation to the driving-pinions on the wheels. These shafts or axles are provided with cams G G and with pinions $h$, gearing with pinions $i$ on the driving-wheels B B.

The cams G alternately engage the two arms $d$ of the lever D, thereby vibrating the seed or corn slide and causing the dropping of the seed or corn from the seed or corn box.

The object of adjusting the shafts F as aforesaid is to permit the isolation of their pinions from the driving-wheel pinions and the substitution therefor of sprocket wheels or pulleys, to allow the said shafts to be driven by belts.

H is a brake pivoted to the rear corner of the frame A, with its handled end resting and acted upon by the spring $i'$. The spring holds the brake free of the wheel.

The forward end of the brake, when its rear end is pressed downwardly, is caused to engage one of the notches $b'$ in the edge of the wheel nearest to it, and thus be brought forcibly down on and brake the wheel while turning the machine, and to enable the operator to drop the seed at uniform distances apart.

What I claim as new, and desire to secure by Letters Patent, is—

1. In a corn-planter, the combination, with the cams G on independent shafts F, with pinions driven by the driving-wheels, of the lever D, connected to the seed-slide, and provided with oblique arms $d$ $d$, extending between said cams, substantially as and for the purpose set forth, 2. In a corn-planter, the combination of the independent shafts F and their pinions, slotted journal-boxes $f$, and adjusting-screws $g$ with the lever D $d$, pivoted to a cross-piece connecting the runners in front of the seed-slide, substantially as shown and described.

3. The combination, with the planter-frame A, of the shoes or opener C and rod E, provided with elastic cushions $e$ between the forwardly-projecting side bars of said frame and the runners, substantially as and for the purpose set forth.

In testimony that I claim the foregoing I have hereunto set my hand this 18th day of August, 1879.

JUNIOR FILLMORE HUDSON.

Witnesses:
DAVID STEVENSON,
C. A. WAYMIRE.